United States Patent
Shimada et al.

(10) Patent No.: US 7,593,462 B2
(45) Date of Patent: Sep. 22, 2009

(54) MOVING PICTURE ENCODING SYSTEM

(75) Inventors: Toshiaki Shimada, Tokyo (JP); Hideo Ohira, Tokyo (JP); Kenichi Asano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 916 days.

(21) Appl. No.: 09/210,775

(22) Filed: Dec. 14, 1998

(65) Prior Publication Data

US 2002/0136297 A1    Sep. 26, 2002

(30) Foreign Application Priority Data

Mar. 16, 1998  (JP) ................. 10-085034

(51) Int. Cl.
H04N 7/12 (2006.01)
(52) U.S. Cl. ............. 375/240.03; 375/240; 375/240.01; 375/240.12
(58) Field of Classification Search .......... 375/240, 375/240.12, 240.13, 240.14, 240.15, 240.03, 375/240.01, 240.02; 358/430
See application file for complete search history.

(56) References Cited

U.S. PATENT DOCUMENTS

| 5,317,397 | A | * | 5/1994 | Odaka et al. ........... 375/240.15 |
| 5,424,779 | A | * | 6/1995 | Odaka et al. ........... 375/240.15 |
| 5,592,226 | A | * | 1/1997 | Lee et al. .............. 375/240.14 |
| 5,650,860 | A | * | 7/1997 | Uz ........................... 358/430 |
| 5,757,434 | A | * | 5/1998 | Klein Gunnewiek et al. ..... 375/240.03 |

FOREIGN PATENT DOCUMENTS

| EP | 0 493 136 A | 7/1992 |
| GB | 2 306 833 A | 5/1997 |
| JP | 5111012 | 4/1993 |
| JP | 7736146 | 5/1995 |
| JP | 9-284772 A | 10/1997 |
| WO | 97/16029 | 5/1997 |

OTHER PUBLICATIONS

"The Foundations of Digital Image Compression," Nikkei BP Publishing Center, pp. 189-196.

* cited by examiner

Primary Examiner—Allen Wong
(74) Attorney, Agent, or Firm—Birch, Stewart, Kolasch and Birch, LLP (57) ABSTRACT

A moving picture encoding system includes an encoding control unit for setting a target quantiser step size used to encode each of different types of pictures included in a unit group to be encoded, and for performing a control operation to generate and furnish a quantiser step size to an encoding unit so that a ratio among the target quantiser step sizes set for the different types of pictures is a predetermined one. The encoding control unit initially sets the quantiser step size for a macroblock to be encoded first in the current picture currently being encoded to the target quantiser step size set for the picture type of that picture, and, each time the encoding unit encodes each of macroblocks remaining in the current picture, then updates the quantiser step size initially set for the first macroblock so that the average of the quantiser step sizes used during the encoding of all macroblocks in the current picture finally approaches the target quantiser step size set for the picture type of the current picture. Thus the system is able to control the amount of codes generated during the encoding of each of the plurality of pictures in the unit group while keeping the relative picture quality among the plurality of pictures adjacent with respect to time.

7 Claims, 3 Drawing Sheets

MOVING PICTURE ENCODING SYSTEM

BACKGROUND OF THE INVENTION

1. Field of the Invention

The present invention relates to a moving picture encoding system that can encode each of moving pictures applied thereto by using each of the input moving pictures and a predictive image which has been coded in advance of the encoding of each of the moving pictures. More particularly, it relates to a method of controlling the encoding of each of the moving pictures.

2. Description of the Prior Art

Figure 5:
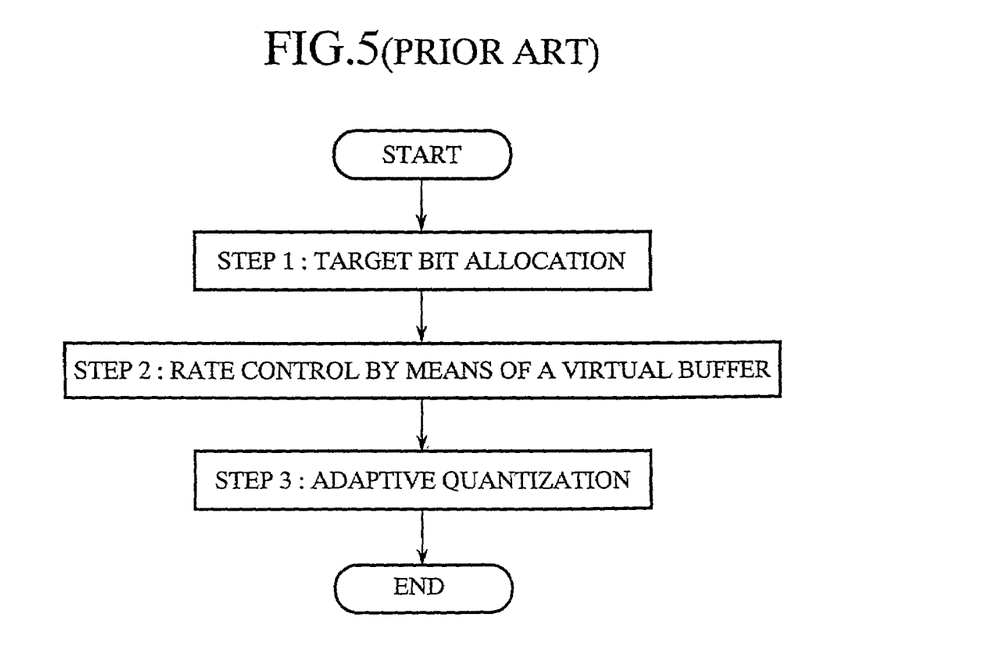
FIG. 5 is a flow diagram showing a procedure for controlling an encoding operation by a prior art moving picture encoding system.

Referring now to FIG. 5, there is illustrated a flow diagram showing a prior art moving picture encoding system, which was adopted by TM5 of the international standard encoding system MPEG-2 and which is described in "The Foundations of Digital Image Compression", Nikkei BP Publishing Center, pp. 189-196. Although the international standard encoding system MPEG-2 does not define a specific method of controlling the encoding of a motion video, that reference only discloses an encoding control method which was adopted by TM5 of MPEG-2 as a test model. The encoding control method, which was adopted by TM5 of MPEG-2, consists of three steps as shown in FIG. 5.

In step 1, in advance of encoding a picture of a certain type such as a picture (or I-picture) to be intra-coded using information only from that frame (or picture) or itself, a picture (or P-picture) to be encoded using a forward prediction, i.e. motion compensated prediction from a past frame, and a picture (or B-picture) coded using a forward or backward prediction, or both, i.e. motion compensated prediction from a past and/or future frame(s), global complexity measures defined by equations (1) to (3) are updated as:

$$Xi = Si * Qi(\text{ave}) \tag{1}$$

$$Xp = Sp * Qp(\text{ave}) \tag{2}$$

$$Xb = Sb * Qb(\text{ave}) \tag{3}$$

where Si, Sp and Sb are the number of bits generated by encoding this picture and Qi(ave), Qp(ave) and Qb(ave) are the average quantization parameter computed by averaging the actual quantiser step sizes mquant used during the encoding of all the macroblocks included in each frame, which are normalized into an integer in the range of 1 to 31. A moving picture that generates a larger amount of information when encoded provides larger global complexity measures Xi, Xp, and Xb. A moving picture that offers a higher degree of compression when encoded provides smaller global complexity measures Xi, Xp, and Xb. The respective global complexity measure is thus a normalized number relatively representing how much amount of information is required for encoding a picture of a certain type: an I-picture, a P-picture, or a B-picture, according to the type of that picture.

The global complexity measures have initial values Xi(init), Xp(init), and Xb(init) given by the following equations (4) to (6):

$$Xi(\text{init}) = 160 * \text{bit\_rate}/115 \tag{4}$$

$$Xp(\text{init}) = 60 * \text{bit\_rate}/115 \tag{5}$$

$$Xb(\text{init}) = 42 * \text{bit\_rate}/115 \tag{6}$$

where bit_rate is a bit rate (bps).

The respective target number of bits for the next picture in a Group of pictures or GOP (Ti, Tp, or Tb) can be computed by dividing the remaining number of bits allocated to the GOP by the number of pictures of the respective picture type (I, P, or B) to which the number of remaining I-, P-, and B-pictures is converted, as shown in equations (7) to (9). Assuming that all pictures not-yet encoded in the GOP are of the same type as that of the current picture currently being encoded, the respective target number of bits (Ti, Tp, and Tb) can serve as a guide for how many bits can be provided for one frame.

$$Ti = R/(1 + NpXp/XiKp + NbXb/XiKb) \tag{7}$$

$$Tp = R/(Np + NbKpXb/KbXp) \tag{8}$$

$$Tb = R/(Nb + NpKbXp/KpXb) \tag{9}$$

where Kp and Kb are universal constants dependent on the quantization matrices. Typically, Kp=1.0 and Kb=1.4. Np and Nb are the number of P-pictures and B-pictures remaining in the current GOP in the encoding order. Furthermore, R is the remaining number of bits assigned to the current GOP. After encoding a picture, R can be given by any one of the following equations (10) to (12):

$$R = R - Si \tag{10}$$

$$R = R - Sp \tag{11}$$

$$R = R - Sb \tag{12}$$

where Si, Sp, or Sb is the number of bits generated in the I-, P-, or B-picture just encoded.

Before encoding the first picture in a GOP, the remaining number of bits R can be given by the following equations (13) and (14):

$$R = G + R \tag{13}$$

$$G = \text{bit\_rate} * N/\text{picture\_rate} \tag{14}$$

where N is the number of pictures in the GOP.

Step 2 is the step in which the reference value of the quantiser step size for each macroblock is set by means of a virtual buffer. In performing step 2, the difference between the amount of information assigned to the current frame currently being encoded and the amount of information that has been generated actually in that frame is fed back in units of macroblocks. If the amount of information that has been generated actually in the picture just encoded is greater than the corresponding pre-programmed amount of information allocated to that picture, the quantiser step size is increased in order to reduce the amount of information which will be generated. Otherwise, the quantiser step size is decreased.

Before encoding the j-th macroblock, the fullness of an appropriate virtual buffer used for only the computation of the quantiser step size, which depends on the picture type (I, P, or B), is computed using a corresponding one of the following equations (15) to (17):

$$di(j) = di(0) + B(j-1) - Ti*(j-1)/MB\_cnt \tag{15}$$

$$dp(j) = dp(0) + B(j-1) - Tp*(j-1)/MB\_cnt \tag{16}$$

$$db(j) = db(0) + B(j-1) - Tb*(j-1)/MB\_cnt \tag{17}$$

where di(0), dp(0), and db(0) are initial fullnesses of virtual buffers one for each picture type, B(j) is the number of bits generated by encoding all macroblocks in the picture up to and including the j-th macroblock, and MB_cnt is the number of macroblocks in the current picture. The final fullness of the virtual buffer is assumed to be the initial fullness (di(0), dp(0), or db(0)) for encoding the next picture of the same type.

The reference quantiser step size Qj of the j-th macroblock is computed using the following equations (18) and (19):

$$Qj=d(j)*31/r \quad (18)$$

$$r=2*bit\_rate/picture\_rate \quad (19)$$

where d(j) denotes the fullness of the appropriate virtual buffer. The initial value for the virtual buffer fullness (di(0), dp(0), or db(0)) is given by a corresponding one of the following equations (20) to (22):

$$di(0)=10*r/31 \quad (20)$$

$$dp(0)=Kp*di(0) \quad (21)$$

$$db(0)=Kb*di(0) \quad (22)$$

In step 3, the reference quantiser step size computed in step 2 is modulated using a spatial activity measure for each macroblock. Following equations (23) to (25), the spatial activity measure for the j-th macroblock is computed from the four luminance sub-blocks in frame-based discrete cosine transform or DCT encoding mode, and the four luminance sub-blocks in field-based DCT encoding mode using the intra (i.e. original) pixel values:

$$abt_j = 1 + \min_{sblk=1,8}(\text{var\_sblk}) \text{ where} \quad (23)$$

$$\text{var\_sblk} = \frac{1}{64}\sum_{k=1}^{64}(P_k - P\_\text{mean})^2 \quad (24)$$

$$P\_\text{mean} = \frac{1}{64}\sum_{k=1}^{64}P_k \quad (25)$$

and $P_k$ are the pixel values in the original 8*8 block. Furthermore, the spatial activity measure for the j-th macroblock is normalized using the following equation (26):

$$N\_act_j=(2*act_j+avg\_act)/(act_j+2*avg\_act) \quad (26)$$

where avg_act is the average of $act_j$ for all macroblocks of the immediately preceding encoded picture. On the first picture, avg_act is 400.

The quantiser step size for the j-th macroblock $mquant_j$ is updated using the normalized spatial activity measure $N\_act_j$ according to the following equation (27) as follows:

$$mquant_j=Q_j*N\_act_j \quad (27)$$

where $Q_j$ is the reference quantiser step size obtained in step 2. The final value of the quantiser step size thus obtained for the j-th macroblock, $mquant_j$ which is used to quantize the macroblock, is clipped to an integer that lies in the range of 1 to 31.

Japanese Patent Application Laying Open (KOKAI) No. 5-111012 discloses technology related to such a prior art moving picture encoding system. In this reference, it is described that the efficiency of encoding is improved without the slightest loss in picture quality when the ratio among the quantiser step sizes Qi, Qp, and Qb, i.e. Qi:Qp:Qb, used in the quantization process of quantizing I-pictures, P-pictures, and B-pictures is 1: αQ0: αQ, where αQ0 and αQ are constant numbers. It is further described in the above reference that both the distribution of the amount of generated codes among frames or fields and the expected value of the quantiser step size are determined on the basis of the quantiser step size used to encode a past frame or past fields, the amount of codes generated in the past frame or past fields, and the evaluated quantity or activity that is related to both the amount of codes to be generated in a future frame or future fields to be encoded and the amount of codes generated in the past frame or fields already encoded, and therefore the distribution of the amount of generated codes and the initial values of the initial value of the quantiser step size can be set so as to optimize the ratio among the quantiser step sizes used to quantize frames or fields using different predictive encoding methods. In addition, it is described that the ratio among the quantiser step sizes used for encoding an I-picture, a P1-picture, and a P2-picture approaches an optimum value as the amount of generated codes assigned to an I-picture is updated as previously mentioned, and the efficiency of encoding is therefore improved.

As previously mentioned, the prior art moving picture encoding system disclosed in Japanese Patent Application Laying Open (KOKAI) No. 5-111012 is so constructed as to set the distribution of the amount of codes among frames or fields and the initial value of the quantiser step size so that the ratio among the quantiser step sizes for the three different picture types is optimized, and update the distribution of the amount of codes to each I-picture in order to make the ratio among the quantiser step sizes used for quantizing I-pictures, P1-pictures, and P2-pictures approach an optimum value. Accordingly, the prior art moving picture encoding system differs from a moving picture encoding system according to the present invention in that the moving picture encoding system according to the present invention determines the ratio among the quantiser step sizes for the three different picture types according to one or more features of the sequence of moving pictures, as will be mentioned below.

The prior art moving picture encoding system that is so constructed as mentioned above controls the encoding operation according to the target number of bits for the respective picture type converted using the global complexity measures set for the three different picture types. As previously mentioned, a moving picture in which a larger amount of information is generated when encoded provides larger global complexity measures Xi, Xp, and Xb. In addition, a moving picture that offers a higher degree of compression when encoded provides smaller global complexity measures Xi, Xp, and Xb. Whether or not the quantiser step size directly related to the picture quality is controlled alone is not defined in step 1 performed when encoding each picture. In other words, the prime purpose of the encoding control of TM5 of the international standard encoding system MPEG-2 is to assign or allocate the target amount of codes to each of the three different picture types according to the respective global complexity measure X that is the product of the number of generated bits S and the respective quantiser step size Q. A problem with the prior art moving picture encoding system is thus that it does not independently control the quantiser step size that is used to quantize the macroblock and is related to the picture quality, and it is therefore difficult to control both the picture quality and the amount of generated codes.

SUMMARY OF THE INVENTION

The present invention is made to overcome the problem mentioned above. It is therefore an object of the present invention to provide a moving picture encoding system that can control both the picture quality and the amount of generated codes by controlling the quantiser step size directly related to the picture quality, thereby controlling the amount of codes generated during the encoding of each of a plurality of pictures in a GOP while keeping the relative picture quality among the plurality of pictures adjacent with respect to time.

In accordance with the present invention, there is provided a moving picture encoding system for encoding each picture included in a sequence of moving pictures in units of a unit group comprised of a plurality of pictures including each picture, the system comprising: an encoding control unit for, when the unit group includes a plurality of different types of pictures which are to be encoded with different encoding methods, setting a target quantiser step size used to encode each of the different types of pictures included in the unit group, and for performing a control operation to generate and furnish a quantiser step size so that a ratio among the target quantiser step sizes set for the different picture types is a predetermined one; and an encoding unit for encoding each picture included in the sequence of moving pictures including each picture using the quantiser step size from the encoding control unit and using either each picture or prediction from a past intra coded image and/or a predictive coded picture.

Preferably, the encoding control unit initially sets the quantiser step size for a macroblock to be encoded first in each picture currently being encoded to the target quantiser step size set for the picture type of each picture currently being encoded, and then, each time it encodes each of macroblocks remaining in each picture currently being encoded, updates the quantiser step size initially set for the first macroblock so that the average of the quantiser step sizes used during the encoding of all macroblocks in each picture finally approaches the target quantiser step size set for the picture type of each picture currently being encoded.

In accordance with a preferred embodiment of the present invention, the encoding control unit further extracts a feature of the sequence of moving pictures to be encoded which represents a degree of complexity of the sequence of moving pictures to be encoded, and wherein the encoding control unit adaptively updates the ratio among the target quantiser step sizes set for the different types of pictures according to the extracted feature of the sequence of moving pictures.

In accordance with another preferred embodiment of the present invention, the encoding control unit determines whether an amount of codes generated when encoding each picture in the unit group will deviate by a predetermined range or even more from a target amount of generated codes for each picture if the encoding is carried out using the target quantiser step sizes set for the plurality of picture types. Also, if the encoding control unit determines that such a deviation from the target amount of generated codes has occurred, it updates the target quantiser step sizes set for the different types of pictures.

In accordance with another preferred embodiment of the present invention, the encoding control unit further extracts a feature of the sequence of moving pictures to be encoded which represents a degree of complexity of the sequence of moving pictures to be encoded, and determines whether a scene change has occurred during the encoding of each picture included in the unit group. Also, if the encoding control unit determines that a scene change has occurred during the encoding of each picture, it updates the ratio among the target quantiser step sizes set for the different types of pictures and their values according to the extracted feature of the sequence of moving pictures.

In accordance with another preferred embodiment of the present invention, the encoding control unit determines whether a scene change has occurred during the encoding of each picture included in the unit group. Also, if the encoding control unit determines that a scene change has occurred during the encoding of each picture, it adaptively changes the type of the current picture currently being encoded in which the scene change occurs and also updates the ratio among the target quantiser step sizes for the different types of pictures and their values.

In accordance with another preferred embodiment of the present invention, the encoding control unit only uses an amount-of-generated-codes-versus-quantiser-step-size characteristic of pictures of a certain type in order to set the target quantiser step sizes used to encode the different types of pictures which are to be encoded with the different encoding methods.

In accordance with another preferred embodiment of the present invention, when the unit group includes a picture to be intra-coded or an I-picture, a picture to be predictive-coded or a P-picture, and a picture to be bidirectionally-predictive-coded or a B-picture, the encoding control unit extracts a feature of the sequence of moving pictures which represents a degree of complexity of the sequence of moving pictures to be encoded. Also, if the extracted feature of the sequence of moving pictures indicates that the amount of motion between pictures is relatively small, the encoding control unit sets target amounts of generated codes allocated to each I-picture, each P-picture, and each B-picture within the unit group so that the target amount of generated codes allocated to each I-picture is the largest, the target amount of generated codes allocated to each P-picture is the second-largest, and the target amount of generated codes allocated to each B-picture is the smallest, and, as the amount of motion between pictures represented by the extracted feature increases, updates the ratio among the target quantiser step sizes for the different types of pictures so that the differences among the target amounts of generated codes allocated to each I-picture, each P-picture, and each B-picture are reduced.

Further objects and advantages of the present invention will be apparent from the following description of the preferred embodiments of the invention as illustrated in the accompanying drawings.

DETAILED DESCRIPTION OF THE PREFERRED EMBODIMENTS

First Embodiment

Figure 1:
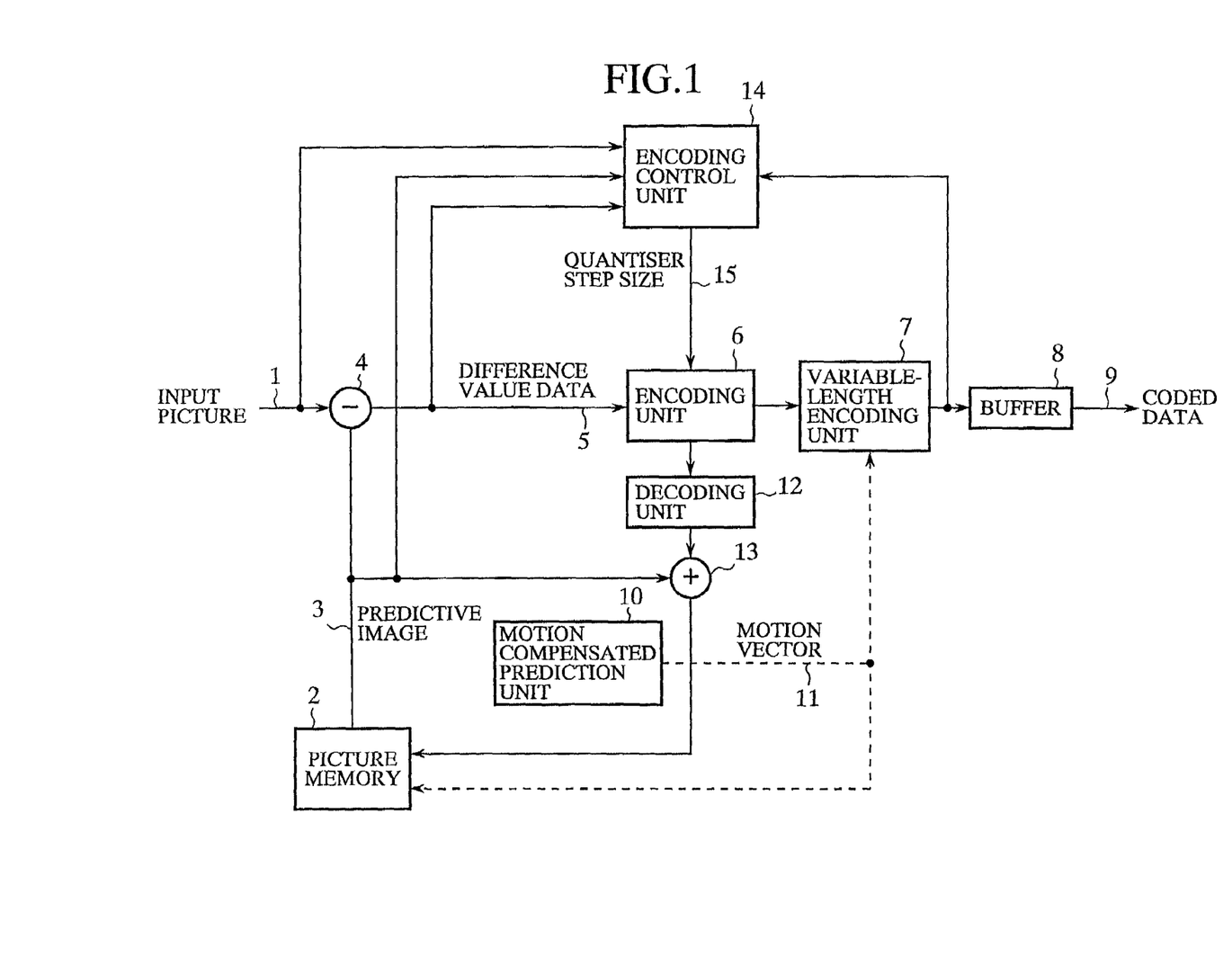
FIG. 1 is a block diagram showing the structure of a moving picture encoding system according to a first embodiment of the present invention.

Referring next to FIG. 1, there is illustrated a block diagram showing the structure of a moving picture encoding system according to a first embodiment of the present invention. In the figure, reference numeral 1 denotes a picture applied to the moving picture encoding system according to the first embodiment, 2 denotes a picture memory for storing a picture which is the same as the input picture 1 or similar to the input picture 1, 3 denotes a predictive image or picture that has been read out of the picture memory 1, 4 denotes a differential operating unit for calculating the difference between the input picture 1 and the predictive image 3, 5 denotes a differential value data furnished by the differential operating unit 4, 6 denotes an encoding unit for encoding either the differential value data 5 or the input picture 1, 7 denotes a variable-length encoding unit for variable-length encoding the data encoded by the encoding unit 6, 8 denotes a buffer for temporarily storing the data variable-length encoded by the variable-length encoding unit 7, and 9 denotes the coded data which is to be transmitted onto a transmission path at a predetermined transmission rate by the buffer 8.

Furthermore, reference numeral 10 denotes a motion compensated prediction unit for making a search for a picture which is similar to or the same as the input picture from the contents of the picture memory 2, 11 denotes a motion vector which is generated by the motion compensated prediction unit 10 and which is furnished to both the picture memory 2 and the variable-length encoding unit 7, 12 denotes a decoding unit for locally decoding the data encoded by the encoding unit 6, 13 denotes an adder for adding the predictive picture 3, which has been predicted on the basis of the moving picture from the motion compensated prediction unit 10, and the locally-decoded data from the decoding unit 12, 14 denotes an encoding control unit for setting a quantiser step size used for encoding each macroblock within a picture to be encoded, on the basis of the input picture 1, the predictive image 3, the differential value data 5, and the data variable-length coded by the variable-length encoding unit 7, and 15 denotes the quantiser step size that is furnished to the encoding unit 6 by the encoding control unit 14.

In operation, the moving picture encoding system according to the first embodiment of the present invention divides each picture applied thereto into a plurality of blocks and then carries out an encoding operation on each of the plurality of blocks. In addition, the moving picture encoding system of the first embodiment is so constructed as to intra-code each block of the input picture 1 using information only from that block and obtain the difference between the already-coded predictive image 3 and the input picture 1 and inter-code each block of the input picture 1 by encoding the difference.

First, a description will be made as to the inter-coding of each block of the input picture 1. First, each block of the predictive picture 3, which is the same as or similar to the input picture 1, is read out of the picture memory 2. The differential operating unit 4 then obtains the difference between each block data of the predictive picture 3 read out of the picture memory 2 and each block data of the input picture 1 applied thereto. The encoding unit 6 then encodes the difference obtained by the differential operating unit 4, and the variable-length encoding unit 7 variable-length encodes the coded difference from the encoding unit 6. The data variable-length encoded is then stored into the buffer 8. The variable-length-encoded data can be read out of the buffer 8 at a predetermined transmission rate and is then transmitted onto a transmission path as a coded data 9. The data encoded by the encoding unit 6 is also furnished to the decoding unit 13 and is locally decoded by the decoding unit 13. The adder 13 adds the locally decoded data to each block data of the predictive image 3 read out of the picture memory 2. The sum of the locally decoded data and each block data of the predictive picture 3 is then stored into the picture memory 2.

Next, a description will be made as to the intra-coding of each block of the input picture. First, each block of the input picture 1 is read out of the picture memory 2. Each block data of the input image 1 read out of the picture memory 2 is furnished to the encoding unit 6, just as it is. The encoding unit 6 then encodes that block data, and the variable-length encoding unit 7 further encodes the data encoded by the encoding unit 6. The data variable-length encoded is then stored into the buffer 8. The variable-length-encoded data can be read out of the buffer 8 and is then transmitted onto a transmission path as a coded data 9 at a predetermined transmission rate. The data encoded by the encoding unit 6 is also furnished to the decoding unit 12 and is locally decoded by the decoding unit 12. The locally decoded block data is then stored into the picture memory 2.

In this specification, a group of a plurality of pictures which comply with a predetermined condition is referred to as a first unit to be encoded. It is assumed that the moving picture encoding system according to the first embodiment of the present invention performs an encoding operation based on the GOP structure in a case of M=3 and N=15 according to the international standard encoding system MPEG2. To be more specific, an intra-coded picture or an I-picture, predictive-coded pictures or P-pictures which are pictures encoded using forward prediction, i.e. motion compensated prediction from a past reference picture or frame, and bidirectionally predictive-coded pictures or B-pictures which are pictures encoded using forward prediction, backward prediction, or both, i.e. motion compensated prediction from a past and/or future reference frame(s) or picture(s) are encoded sequentially in the order of "IBBPBBPBBPBBPBB". Then they will be displayed in the order of "BBIBBPBBPBBPBBP".

Since the three types of pictures, an I-picture, a P-picture, and a B-picture are pictures encoded with different encoding methods, each of them has its own amount of generated codes. In general, when a picture is encoded with those three encoding methods, the amount of generated codes of the I-picture is the largest, and the amount of generated codes of the P-picture is the second largest. The amount of generated codes of the B-picture is the smallest because a number of prediction methods can be applied to generate the B-picture. In addition, whether or not the encoded picture can be the predictive picture 3 used for encoding future frames or pictures must be taken into account. In other words, an I-picture is a picture intra-coded or encoded using information only from itself and it can be the predictive image 3 used for the creation of a future P-picture and a future B-picture.

A P-picture is a picture which is encoded using forward motion compensated prediction from a past coded picture such as a past intra-coded picture (or an I-picture) or predictive coded picture (or a P-picture), and it can be the predictive image 3 used for the creation of a future P-picture and a future B-picture. A B-picture is a picture which is encoded using forward motion compensated prediction, backward motion compensated prediction, or both from a past and/or future coded picture(s) such as a past I- or P-picture and/or a future P-picture, and it cannot be the predictive image 3 used for the creation of any future picture. Accordingly, B-pictures that can prevent prediction errors from propagating to future pictures make it easy to reduce their amount of generated codes. However, it is impossible to reduce only the amount of generated codes of a B-picture to an extreme, taking a balance between the picture quality of the B-picture and those of other types of pictures into account.

The quantiser step size used for quantizing a moving picture is directly related to the amount of generated codes and the picture quality of the moving picture to be encoded. In other words, when the quantiser step size is small and fine quantization is therefore carried out, a large amount of codes is generated and the reproducibility is therefore improved so that finer detail can be recognized, that is, the picture quality is improved. In contrast, when the quantiser step size is large and coarse quantization is therefore carried out, a small amount of codes is generated and the reproducibility is therefore reduced so that finer detail cannot be recognized, that is, the picture quality is reduced. The picture quality is thus reduced with an increase in the number of coefficients abandoned or rounded in the quantization process.

In the prior art moving picture encoding system as shown in FIG. 5, the target number of bits of the next picture included in the GOP being encoded (Ti, Tp, or Tb) is computed using the global complexity measures (Xi, Xp, and Xb). Although the number of bits allocated to the next picture to be encoded next is therefore made known, how the quantization is carried out for the next picture is not made clear in performing step 1 of FIG. 5. In addition, it is impossible to directly recognize the quantiser step size because the parameters called the global complexity measures (Xi, Xp, and Xb) are used in the prior art moving picture encoding system.

In contrast, the moving picture encoding system according to the first embodiment of the present invention sets a target quantiser step size for each picture included in the first unit to be encoded or the GOP in performing step 1 as shown in FIG. 5 in the following manner.

In performing the setting of the target quantiser step size for each picture within the GOP (Qi, Qp, or Qb), the encoding control unit 14 adjusts the ratio among the target quantiser step sizes for the three different picture types or I, P, and B so that the ratios Qi:Qp, Qi:Qb, and Qp:Qb are set to predetermined ratios, respectively. This setting results in making it possible to maintain the balance among the picture qualities of all the pictures in the GOP.

If there is a need to adjust the amount of generated codes during the encoding of the GOP, the encoding control unit 14 can adjust the absolute value of the target quantiser step size for each of the three different picture types while maintaining the ratio among the target quantiser step sizes set for the three different picture types. To reduce the amount of generated codes of a picture to be encoded, the encoding control unit 14 increases the absolute values of the target quantiser step sizes set for the three different picture types while maintaining the ratio among them. Otherwise, the encoding control unit 14 decreases the absolute values of the target quantiser step sizes set for the three different picture types while maintaining the ratio among them. Preferably, such the updating is carried out for the next picture to be encoded next. As an alternative, such the updating is carried out so that the target quantiser step size for all remaining macroblocks to be encoded in the same picture is updated.

When setting the quantiser step size for each macroblock of a picture to be encoded, which is a second unit to be encoded, the encoding control unit 14 initially sets the target quantiser step size for the first macroblock to be encoded first in the current picture to the target quantiser step size set for the picture type of that picture. Each time the encoding unit 6 encodes the next macroblock, the encoding control unit 14 updates the quantiser step size to be used for encoding the next macroblock. The encoding control unit 14 further controls the updating so that the average of the quantiser step sizes used or to be used for encoding all macroblocks included in the current picture currently being encoded finally approaches the target quantiser step size set for the picture type of the current picture. By virtue of the control operation performed by the encoding control unit 14, the amount of codes generated when encoding each picture in the GOP can fall in a predetermined range with its target value for the amount of generated codes as the center of the predetermined range.

As previously mentioned, the moving picture encoding system according to the first embodiment of the present invention can perform an encoding operation based on the GOP structure in the case of M=3 and N=15. However, it is clear from the above description that the moving picture encoding system can encode each picture included in another unit to be encoded including a sequence of pictures of certain types. How the group of pictures is composed of does not limit the contents of the present invention.

The reason why the values of the target quantiser step sizes set for the three different picture types are not specified in the above description is that the present invention attaches importance to the relative relationship or ratio among the target quantiser step sizes set for the three different picture types. The maintenance of the ratio means that the relative picture quality among the three different types of pictures is unchanged. Changing the absolute values of the target quantiser step sizes while maintaining the ratio means that the amount of codes generated when encoding each picture can be adjusted while the relative picture quality among the three different types of pictures is maintained.

As previously mentioned, the moving picture encoding system according to the first embodiment of the present invention can update the quantiser step size for each macroblock to be encoded next each time it encodes each macroblock, and control the updating so that the average of the quantiser step sizes for all the macroblocks included in the picture being encoded finally approaches the target quantiser step size set for the picture type of the picture. However, the control method does not limit the present invention and it is clear from the above description that another control method can be applied to the first embodiment. The encoding control unit only needs to control the quantiser step size for each macroblock to be encoded so that the picture quality of each macroblock in question matches those of macroblocks in the vicinity of each macroblock and a predetermined amount of codes is generated when encoding each macroblock.

As previously explained, when there are a plurality of different types of pictures in a first unit to be encoded, the moving picture encoding system according to the first embodiment of the present invention can set a target quantiser step size for each of the plural different picture types so that the ratio among the target quantiser step sizes set for the plural different picture types is a predetermined ratio. The moving picture encoding system then updates the quantiser step size for each macroblock to be encoded so that the average of the quantiser step sizes for all the macroblocks included in the picture being encoded finally approaches the target quantiser step size set for the picture type of the picture. Thus the moving picture encoding system can directly adjust the quantiser step size for each macroblock that is directly related to the picture quality, and hence control both the picture quality and the amount of generated codes. Consequently, the first embodiment of the present invention can offer an advantage of being able to provide desired picture quality and make the amount of codes generated per unit of time fall in a predetermined range with the target amount of generated codes as the center of the range. To be more specific, the first embodiment of the present invention can offer an advantage of being able to control or adjust the amount of codes generated during the encoding of each of a plurality of pictures in the GOP while preventing the picture quality from changing among the plurality of pictures adjacent with respect to time.

Second Embodiment

In the prior art moving picture encoding system as shown in FIG. 5, the relationship between the global complexity measures of I-picture and P-picture is specified by Kp=1.0 and the relationship between the global complexity measures of I-picture and B-picture is specified by Kb=1.0. In addition, it is assumed that Kp and Kb showing the relationships between the complexity measures of I-picture and P-picture and between the complexity measures of I-picture and B-picture are universal constants. However, Kp and Kb are not universal actually. In addition, the universal constants are not necessarily optimized. This is because each block of quantized coefficients includes some frequency components dependent on the complexity of an image or pattern in each macroblock in the current picture currently being encoded.

Figure 2:
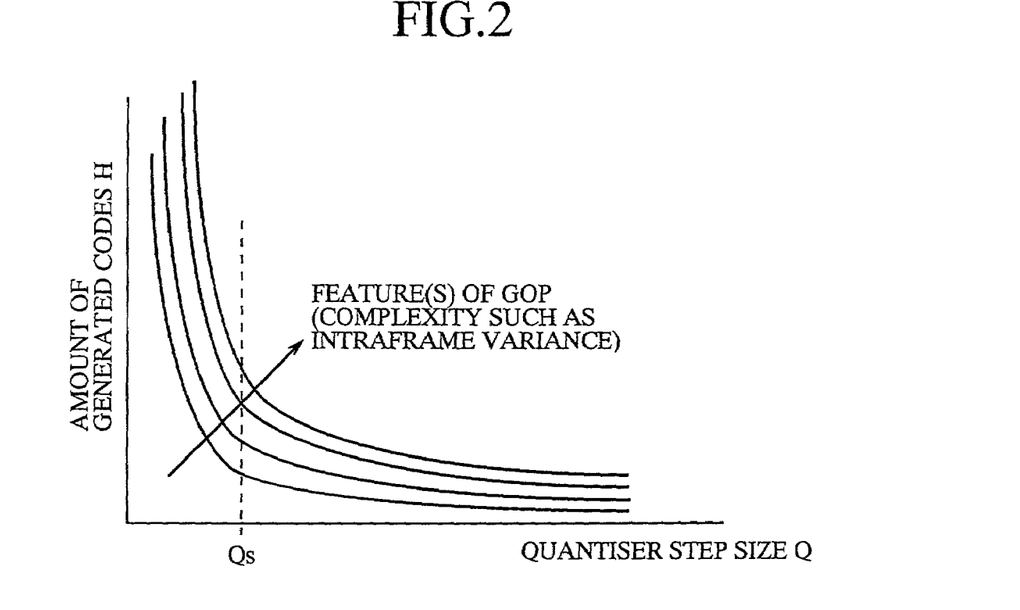
FIG. 2 is a graph showing a relationship between the quantiser step size and the amount of generated codes in a moving picture encoding system according to a second embodiment of the present invention.

A moving picture encoding system according to a second embodiment of the present invention is so constructed as to extract one or more features of a sequence of moving pictures to be encoded by means of an encoding control unit 14 and adaptively update or change the ratio among the target quantiser step sizes set for three different picture types according to the features of the sequence of moving pictures extracted by the encoding control unit 14. Referring next to FIG. 2, there is illustrated a graph showing a relationship between the quantiser step size Q used for encoding a picture of a certain type (I, P, or B) and the amount of codes H generated when encoding the picture. It is known that the relationship between the quantiser step size Q and the amount of generated codes H is approximately-indirect proportionality.

As shown in FIG. 2, the Q-H plot of a picture of a certain type varies according to one or more extracted features of a sequence of moving pictures to be encoded, which represent the complexity of images included in the sequence of moving pictures. In other words, the amount of codes generated during the encoding of a picture can vary according to the image complexity of a sequence of moving pictures including that picture even though the same quantiser step size is used. When each block of a picture to be encoded undergoes an orthogonal transformation and a quantization process (this case corresponds to MPEG2), for example, most of transformed coefficients are dc components and hence few of them are ac components in a case that each block of the picture having pixels of almost equal value is orthogonally transformed. In other words, when a picture having pixels of nearly equal value is encoded, the amount of generated codes is small. On the other hand, when a correlation between each pixel and adjacent pixels is low and hence the amount of variation in the values of all pixels within the current frame to be encoded, which is referred to as the intraframe variance, is large, the orthogonal transformation yields many ac components in the transformed coefficients as well as dc components.

As a picture to be encoded is more complicated, the Q-E plot is shifted in a direction of a right upward-pointing arrow as shown in FIG. 2. To compute the target quantiser step size for a picture of a certain type from its target amount of generated codes, the moving picture encoding system of the second embodiment includes a plurality of Q-H plots for each of the three different picture types, which are dependent upon the image complexity of that picture. As an example, in the case of M=3, N=15, the transmission bit rate=15 Mbps, and the frame rate=30 Hz, 7.5 Mbit of codes are assigned to one GOP including 15 frames. That is, 0.5 Mbit of codes are assigned to each frame or picture included in the GOP. According to one or more extracted features of the sequence of moving pictures or GOP to be encoded, the moving picture encoding system of the second embodiment can determine which Q-E plot as shown in FIG. 2 is the closest to the Q-H plot actually established for the sequence of moving pictures to be encoded and select the closest Q-H plot, and then compute the target quantiser step size Qs from the target amount of generated codes using the selected Q-E plot.

The determination of the image complexity of the sequence of moving pictures to be encoded can be carried out using the intraframe variance, i.e. the amount of variation in the values of all pixels in the current frame to be encoded. For example, the intraframe variance can be defined as either the summation of the absolute values of the differences between all the pixel values and the average of them: $\Sigma|Xi-m|$, where Xi denotes the value of each pixel and m denotes the average of all the pixel values, or the summation of the squares of the differences between all the pixel values and the average of them: $\Sigma(Xi-m)^2$. As an alternative, the determination of the image complexity of the sequence of moving pictures to be encoded can be carried out using the summation of the absolute values of the differences between all the pixel values in the current picture currently being encoded and all the pixel values in a past picture, which is referred to as the interframe absolute difference summation. The method of determining the image complexity of the sequence of moving pictures to be encoded does not limit the second embodiment of the present invention. Any determination method capable of making it possible for the encoding control unit 14 to select one Q-E plot from among a plurality of Q-H plots each showing the relationship between the quantiser step size Q and the amount of generated codes H for a picture of a certain type at a degree of image complexity can be used.

As previously mentioned, since the distribution of dc and ac components in the orthogonally-transformed coefficients differs according to the image complexity of the sequence of moving pictures to be encoded, the distribution of dc and ac components in the orthogonally-transformed coefficients can be used to determine the image complexity.

Figure 3:
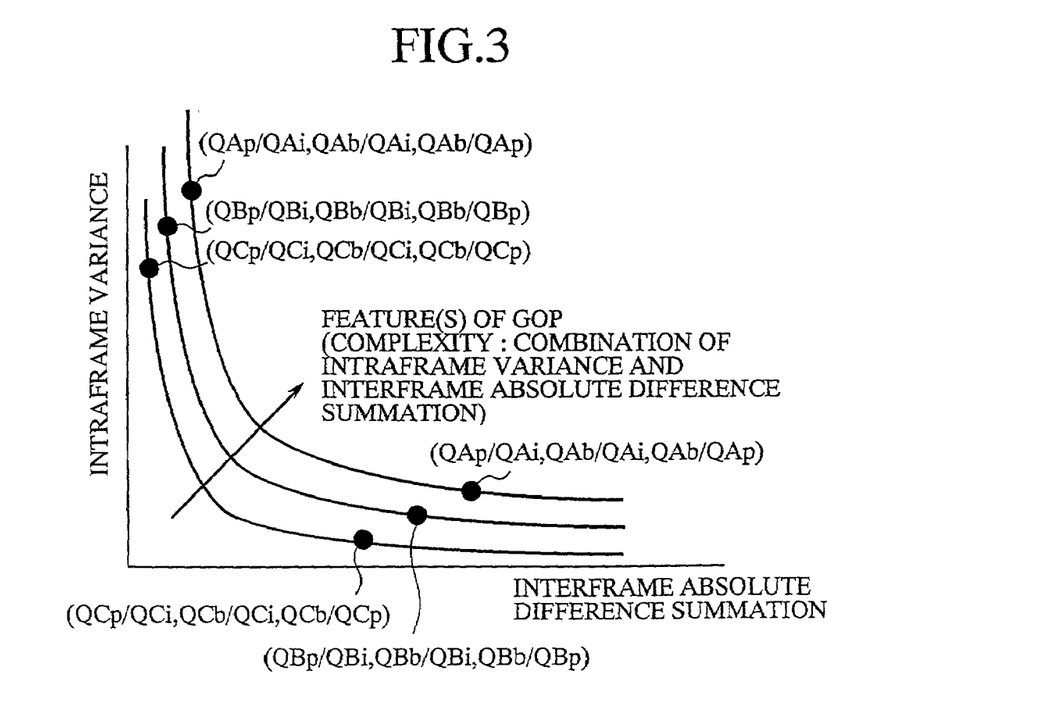
FIG. 3 is a graph showing a relationship between the summation of the absolute values of the differences between the values of all pixels in the current frame and those of all pixels in a past frame, and the amount of variation in the values of all pixels within the current frame, in the moving picture encoding system according to the second embodiment of the present invention.

For example, to select one Q-E plot from among a plurality of Q-H plots, the moving picture encoding system according to the second embodiment of the present invention can use the intraframe variance or both the intraframe variance and the interframe absolute difference summation. Referring next to FIG. 3, there is illustrated a graph showing a relationship between the interframe absolute difference summation and the intraframe variance, which is established in the encoding control unit 14 according to the second embodiment of the present invention. The horizontal axis shows the interframe absolute difference summation, and the vertical axis shows the intraframe variance. Each plot in the figure indicates a relationship among the ratios between the target quantiser step sizes set for the three different picture types: Qp/Qi, Qb/Qi, and Qb/Qp. In the figure, the left-hand string in each pair of parentheses ( ) represents the ratio Qp/Qi, the center string represents the ratio Qb/Qi, and the right-hand string represents the ratio Qb/Qp. As shown in FIG. 3, there can be provided some groups, in this case three groups: A, B, and C, according to combinations of both the interframe absolute difference summation and the intraframe variance.

The moving picture encoding system according to the second embodiment extracts the two features of the sequence of moving pictures to be encoded: both the interframe absolute difference summation and the intraframe variance, by means of the encoding control unit 14, and determines which group or plot of FIG. 3 is the closest to the extracted combination of the interframe absolute difference summation and the intraframe variance. The moving picture encoding system then determines the ratio among the target quantiser step sizes to be set for the three different picture types using the selected plot. It can be understood that the determination of the initial ratio that is initially set Just after the system starts encoding is carried out using only the intraframe variance of the first picture to be encoded first in the first GOP.

Instead of the combination of the interframe absolute difference summation and the intraframe variance, only the interframe absolute difference summation, only the intraframe variance, another feature such as the summation of the squares of the differences between all the pixel values in the current picture currently being encoded and all the pixel values in a past picture, or a combination of some of them can be used as the feature(s) of the sequence of moving pictures to be encoded to determine the ratio among the target quantiser step sizes to be set for the three different picture types. The need to determine the ratio among the target quantiser step sizes set for the three different picture types is to group the setting of the ratio among the target quantiser step sizes set for the three different picture types into a plurality of cases according to the extracted feature(s) of the sequence of moving pictures to be encoded. The definition of the feature(s) of the sequence of moving pictures to be encoded does not limit the present invention.

As previously mentioned, the moving picture encoding system according to the second embodiment of the present invention can adaptively control the ratio among the target quantiser step sizes for a plurality of picture types according to one or more features of the sequence of moving pictures which have been extracted by the encoding control unit 14. The moving picture encoding system according to the second embodiment thus can set the ratio among the target quantiser step sizes for the plural different picture types to a proper value. Accordingly, the second embodiment of the present invention can offer an advantage of being able to control or adjust the amount of codes generated during the encoding of each of a plurality of pictures in the GOP while preventing the picture quality from changing among the plurality of pictures adjacent with respect to time.

Third Embodiment

In the above-mentioned first and second embodiments, the encoding control unit 14 sets the target quantiser step size for each of the three different types of pictures included in one GOP. When setting the quantiser step size for each macroblock in the current picture to be encoded, the encoding control unit 14 initially sets the quantiser step size used for encoding the first macroblock in that picture to the target quantiser step size set for the picture type of that picture. Each time the encoding unit encodes the next macroblock in the current picture, the encoding control unit 14 updates the quantiser step size used for encoding the next macroblock so that the average of the quantiser step sizes for all the macroblocks included in the current picture finally approaches the target quantiser step size set for the current picture. There is a case where the target quantiser step sizes have to be changed according to a picture to be encoded. A moving picture encoding system according to a third embodiment of the present invention is so constructed as to change the target quantiser step sizes set for the three different picture types in such a case.

Even when encoding a sequence of moving pictures each including a similar pattern, brisk movements of an object or a change in the size of an object can cause difficulty in making a correct prediction. Otherwise, an abrupt weakening of a movement of an object can make it easy for the moving picture encoding system to make a correct prediction. In such cases, it can be expected that since the amount of generated codes changes greatly between pictures or within a picture being encoded, there will occur a deviation more than a predetermined range from the target amount of generated codes set for the current picture type. It is therefore preferable to change the target quantiser step sizes set for the three different picture types when it can be expected that such a deviation will occur.

In the moving picture encoding system according to the third embodiment of the present invention, the encoding control unit 14 can determine that it is difficult to update the quantiser step size used for encoding the next macroblock so that the average of the quantiser step sizes set or to be set for all the macroblocks in the current picture approaches the target quantiser step size set for the current picture, when the average of the quantiser step sizes set for already-encoded macroblocks in the current picture deviates by more than a predetermined range from the target quantiser step size set for the current picture type and the amount of codes generated during the encoding of macroblocks already coded deviates by a predetermined range or even more from its target value. In other words, in such a case the encoding control unit determines that the amount of codes to be generated during the encoding of a future picture in the current GOP as well as the current picture will deviate by a predetermined range or even more from the target amount of generated codes for that picture if the encoding is carried out using the target quantiser step sizes set for the three different picture types in the current GOP. When the moving picture encoding system determines that it is difficult to perform the control operation, it changes the target quantiser step sizes set for the three different picture types to encode future pictures in the current GOP. As an alternative, the encoding control unit 14 can set a target quantiser step size used for encoding remaining macroblocks in the current picture and change the target quantiser step sizes for picture types of future pictures in the GOP.

The method of changing the target quantiser step sizes for the plurality of types of pictures can be implemented by increasing or decreasing them in steps so that the buffer 8 does not overflow or underflow. The encoding control unit 14 determines which group or characteristic plot of FIG. 3 is the closest to the extracted features of the sequence of moving pictures currently being encoded, and then updates the ratio among the target quantiser step sizes set for the different picture types so that it is consistent with the group selected.

As previously mentioned, the moving picture encoding system according to the third embodiment of the present invention can adjust the target quantiser step sizes for a plurality of different picture types in the GOP currently being processed when it determines during the encoding of the current picture that there will occur a deviation more than a predetermined range from the target amount of generated codes if it continues to encode all future pictures in the GOP using the old target quantiser step sizes. Thus, the moving picture encoding system according to the third embodiment can set the target quantiser step sizes for a plurality of different picture types to proper values during the encoding of the GOP. Accordingly, the third embodiment of the present invention can offer an advantage of being able to control or adjust the amount of codes generated during the encoding of each of a plurality of pictures in the GOP while preventing the picture quality from changing among the plurality of pictures adjacent with respect to time.

Fourth Embodiment

There is a possibility that all of a frame to be encoded included in a sequence of moving pictures being encoded may be new information. This is called scene change. Since there is no correlation between a picture to be encoded after a scene change occurs and past pictures, in general, the current picture is encoded using information only from itself, or using an intraframe prediction. The current picture just encoded is thus an I-picture. In contrast, if an interframe prediction is forcedly made and the picture is encoded using motion compensated prediction either from a past frame or from a past and/or future frame(s) (P-picture or B-picture is thus generated), the interframe prediction can cause a large deviation from an actual value and therefore there can be many coefficients to be encoded. In either case, when encoding a picture just after a scene change has occurred, the amount of generated codes must be increased. It is therefore necessary to set the target quantiser step sizes for future pictures included in the current GOP to new values and update the target amount of generated codes for each of the future pictures. A moving picture encoding system according to a fourth embodiment of the present invention is so constructed as to change the ratio among the target quantiser step sizes set for a plurality of different picture types in the GOP and update the target quantiser step sizes in such a case that it is necessary to set the target quantiser step sizes for future pictures included in the current GOP to new values and change the target amount of generated codes for each of the future pictures in the GOP.

When an encoding control unit 14 of the fourth embodiment determines that a scene change has occurred during the encoding of the first unit to be encoded, the encoding control unit 14 changes the target quantiser step sizes for future pictures included in the current GOP. The changing of those target quantiser step sizes is performed by estimating the target amount of generated codes that is to be allocated to each of the picture types of pictures remaining in the current GOP, and then updating the ratio among the target quantiser step sizes set for the picture types of remaining pictures in the current GOP and their values according to the amount of generated codes re-assigned to each of the picture types of remaining pictures in the GOP. To this end, the encoding control unit 14 determines which group or plot representing the picture feature as shown in FIG. 3 is the closest to the extracted features of the current sequence of moving pictures including the picture in which a scene change occurs, and then re-assigns the estimated amount of generated codes to each of the picture types of remaining pictures in the current GOP so as to change the ratio among the target quantiser step sizes for the plural different picture types of remaining pictures so that it is consistent with the group selected. Finally, the encoding control unit 14 updates the target quantiser step sizes for the plural different types of remaining pictures in the GOP.

Since it can be expected that a large change in the amount of generated codes takes place immediately after a scene change has occurred, it is preferable to frequently examine whether the actual amount of generated codes agrees with the corresponding target amount of generated codes re-assigned, and repeatedly change the ratio among the target quantiser step sizes for the different picture types and their values in order to make the amount of codes generated become stable. For example, in the case of M=3, each time the encoding unit processes each group including a B-picture, a B-picture, and a P-picture, the encoding control unit 14 can repeatedly re-assign the target amount of generated codes to each of the two different picture types, and then change the ratio between the target quantiser step sizes for the two different picture types and their absolute values. As an alternative, the encoding control unit 4 can perform the re-assigning of the target amount of generated codes on each picture to be encoded included in the GOP. Since all that the encoding control unit 4 has to is to control the amount of generated codes so that it falls in a predetermined range and enable the picture quality to change smoothly among a plurality of pictures adjacent with respect to time while keeping the picture quality of the plurality of adjacent pictures in balance, it is not necessary to specify both the frequency with which the target amount of generated codes is assigned to each of remaining pictures to be encoded and the frequency with which the updating of the ratio among the target quantiser step sizes for the different picture types of remaining pictures and their absolute values is performed. Those frequencies do not limit the present invention.

As previously mentioned, the moving picture encoding system according to the fourth embodiment of the present invention can change the ratio among the target quantiser step sizes for a plurality of different picture types and update the quantiser step sizes according to one or more extracted features of the sequence of moving pictures to be encoded when it determines that there has occurred a scene change. Thus, the moving picture encoding system according to the fourth embodiment can set the target quantiser step sizes for the plurality of different picture types to proper values, and set the ratio among them to a proper value. Accordingly, the fourth embodiment of the present invention can offer an advantage of being able to control or adjust the amounts of codes generated during the encoding of each of a plurality of pictures in the GOP while keeping the relative picture quality among the plurality of pictures adjacent with respect to time.

Fifth Embodiment

As previously explained, the moving picture encoding system according to the above-mentioned fourth embodiment of the present invention updates the ratio among the target quantiser step sizes set for a plurality of different picture types included in one GOP and their absolute values while maintaining the encoding condition of M=3 and N=15 even though it has detected a scene change. In contrast, a moving picture encoding system according to a fifth embodiment of the present invention is so constructed as to change the encoding condition, e.g. the type of a picture to be encoded next during the encoding of the current GOP when it detects a scene change and then update the ratio among the target quantiser step sizes for the picture types of pictures remaining in the current GOP and their absolute values.

In general, when encoding the current picture in which a scene change occurs, that is, all or most of which is new information, the amount of codes generated will increase because there is no correlation between the current picture and past pictures, as previously mentioned. The encoding of the current picture using motion compensated prediction from the immediately preceding picture reduces the efficiency of encoding.

An encoding control unit 14 according to a fifth embodiment of the present invention intra-codes the current picture in which a scene change occurs, i.e., all or most of which is new information, using information only from that picture so as to generate an I-picture. In other words, the encoding control unit 14 changes the type of the current picture in which a scene change occurs to I picture type. The encoding control unit 14 then estimates and re-assigns the target amount of generated codes to each of future pictures in the current GOP including the current picture so as to change the ratio among the target quantiser step sizes for the different picture types of those remaining pictures and their absolute values.

Whether a scene change has occurred can be determined by determining whether or not the summation of the squares of differences between the pixel values of a previous frame or picture and those of the current frame or picture is greater than a predetermined threshold value, determining whether or not the summation of the absolute values of differences between the pixel values of a previous frame and those of the current frame is greater than a predetermined threshold value, determining whether or not another value making it possible to evaluate the degree of how much of the current picture is new information is greater than a predetermined threshold value, or a combination of those determination results. The method of determining if a scene change has occurred does not limit the present invention.

Consider a possibility that the moving picture encoding system will encode the current picture, which is to be encoded using motion compensated prediction from a past and/or future frame(s) just after a scene change occurs, using motion compensated prediction from a past frame, that is, it will change the type of the current picture from B to P. In such a case, a forward prediction is carried out using the immediately preceding I-picture or P-picture that has been encoded immediately before a scene change occurs. If the amount of generated codes is less than the amount of codes to be generated when intra-coding the current frame, there is a possibility that the moving picture encoding system encodes the current picture, which is to be encoded using motion compensated prediction from a past and/or future frame(s), using motion compensated prediction from a past frame. The higher degree of encoding efficiency provided by the motion compensated prediction from the immediately preceding frame, as compared with the encoding efficiency to be provided by the intra-coding of the current frame, means that a correct prediction can be made even though a scene change occurs. Accordingly, the case of generating a P-picture instead of a B-picture just after a scene change occurs must be distinguished from the above-mentioned case of intra-coding the current picture using information only from that frame just after a scene change occurs so as to generate an I-picture.

As previously mentioned, when the moving picture encoding system according to the fifth embodiment of the present invention determines that there has occurred a scene change in the current GOP, it adaptively changes the type of the current picture to be encoded just after the scene change has occurred and then changes the ratio among the target quantiser step sizes for the different picture types of remaining pictures in the current GOP and the target quantiser step sizes. Thus, the moving picture encoding system according to the fifth embodiment can set the target quantiser step sizes for the different picture types to proper values, and also set the ratio among them to a proper value. Accordingly, the fifth embodiment of the present invention can offer an advantage of being able to control or adjust the amount of codes generated during the encoding of each of a plurality of pictures in the GOP while keeping the relative picture quality among the plurality of pictures adjacent with respect to time.

Sixth Embodiment

The moving picture encoding system according to any one of the first to fifth embodiments mentioned above determines the absolute value of the target quantiser step size used for encoding each of plural different types of pictures and the ratio among the target quantiser step sizes set for the different picture types, according to a plurality of Q-H plots as shown in FIG. 2 and a plurality of characteristic curves as shown in FIG. 3. In contrast, a moving picture encoding system according to a sixth embodiment of the present invention is so constructed as to extract one or more features indicating the complexity of images in a sequence of moving pictures to be encoded, determine which one of a plurality of Q-H plots established for pictures of a certain type, e.g. I-pictures, as shown in FIG. 2, is the closest to the Q-H characteristic actually established for the extracted features of the sequence of moving pictures, select the closest Q-H plot, and compute the target quantiser step size for pictures of the certain type, e.g. I-pictures from the corresponding target amount of generated codes according to the selected Q-H plot and further compute the target quantiser step sizes for pictures of other types, e.g. P-pictures and B-pictures from the corresponding target amounts of generated codes, using a plurality of predetermined conversion equations, respectively.

Like the aforementioned second to fifth embodiments, the moving picture encoding system of the sixth embodiment determines the complexity of images in the sequence of moving pictures to be encoded using one or more features extracted from the sequence of moving pictures such as the intraframe variance, i.e. the amount of variation in the value of each pixel within the current frame to be encoded. For example, the intraframe variance can be defined as either the summation of the absolute values of the differences between all the pixel values and the average of them: $\Sigma|Xi-m|$, where Xi denotes the value of each pixel and m denotes the average of all the pixel values, or the summation of the squares of the differences between all the pixel values and the average of them: $\Sigma(Xi-m)^2$. As an alternative, the determination of the complexity can be carried out using the summation of the absolute values of the differences between all the pixel values in the current picture currently being encoded and all the pixel values in a past picture. The distribution of dc and ac components of the orthogonally transformed coefficients differs according to the complexity of the current frame. Accordingly, the distribution of dc and ac components of the orthogonally transformed coefficients can be used to determine the complexity of the current frame currently being encoded. Alternatively, any combination of the features shown above can be used.

Figure 4:
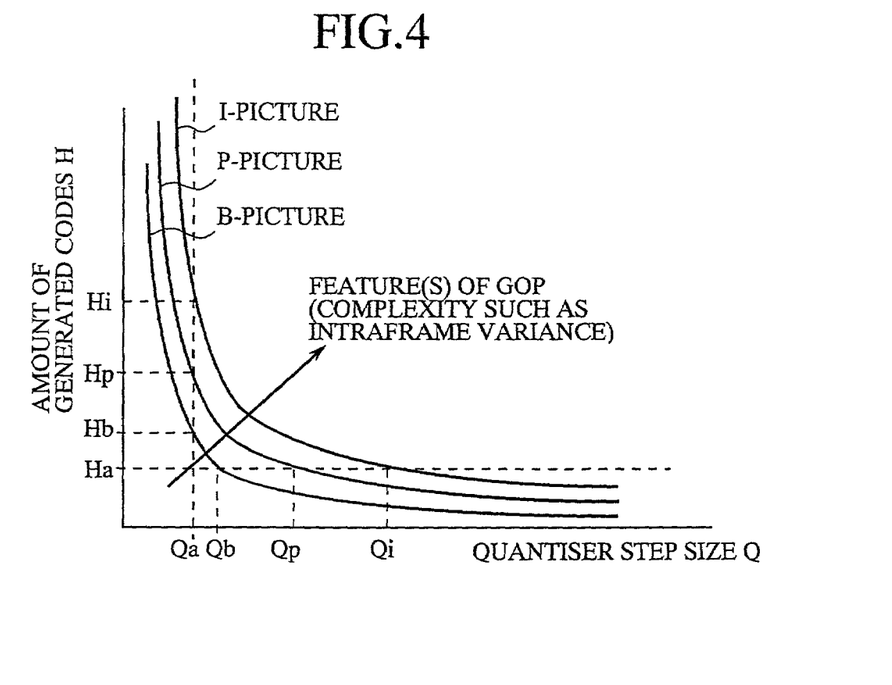
FIG. 4 is a graph showing examples of Q-H characteristic curves established for I-pictures, P-pictures, and B-pictures.

The encoding control unit 14 includes a plurality of Q-H characteristic tables for pictures of a certain type, e.g. I-pictures, representing a plurality of Q-H plots as shown in FIG. 2. As previously mentioned, the plurality of Q-H characteristic tables corresponds to a variety of degrees of complexity that a picture of a certain type can have, respectively. The encoding control unit 14 extracts one or more features, such as the intraframe variance, of the sequence of moving pictures to be encoded first. The encoding control unit 14 then determines which one of the plurality of Q-H plots or characteristic tables established for pictures of the certain type, e.g. I-pictures, as shown in FIG. 2, is the closest to the actual Q-H characteristic in the case of the extracted features of the sequence of moving pictures, and selects the closest Q-H plot table. The encoding control unit 14 computes the target quantiser step size Qs for pictures of the certain type, e.g. I-pictures from the corresponding target amount of generated codes according to the selected Q-H plot and further computes the target quantiser step sizes for pictures of the other types, e.g. P-pictures and B-pictures from the corresponding target amounts of generated codes, using a plurality of predetermined conversion equations, respectively. Referring next to FIG. 4, there is illustrated a graph showing examples of Q-H plots for the three different picture types: I, P, and B. The three Q-H plots for the three different picture types differ from each other, as shown in the figure. The amounts of codes generated when encoding an I-picture, a P-picture, and a B-picture using the same quantiser step size Qa are Hi, Hp, and Hb, as shown in FIG. 4. The target quantiser step sizes for the three different picture types giving the same amount of generated codes Ha are Qi, Qp, and Qb, as shown in FIG. 4. When actually encoding a picture included in the GOP, the encoding control unit 14 does not control the target quantiser step sizes for the three different picture types so that the same amount of codes are generated during the encoding of any of the three different types of pictures. This is because Qi is the largest, as shown in FIG. 4, and therefore the picture quality of I-pictures used for predictions for generating P-pictures and B-pictures is reduced.

The reason why only the plurality of Q-H plots for pictures of a certain type, in this case I-pictures, are provided is to simplify the process of controlling the encoding operation performed by the encoding control unit 14. In addition, since the encoding control unit has only the tables respectively representing the plurality of Q-H plots for I-pictures are provided for performing arithmetic operations in a computer simulation or actual hardware, memory usage is economized on. Instead of using the tables, the plurality of Q-H plots for pictures of a certain type can be processed through arithmetic computations of at least a function. In this case, only the performance of arithmetic computations of the function is needed and therefore the time required for the performance of computations of the function is reduced compared with the use of the tables.

As previously explained, the ratio among the target quantiser step sizes for the three different picture types and their values are updated in units of GOP, that is, each time the system processes each GOP so that a desired amount of codes is generated when encoding each picture included in each GOP. As an alternative, the ratio among the target quantiser step sizes for the three different picture types and their values can be updated in a unit of time, e.g. one second so that a desired amount of codes is generated in the unit of time. In this case, the upper limit of the amount of generated information is the sum of the target amount of codes generated per unit of time and the amount of information stored in the transmission buffer, and the lower limit of the amount of generated information is the difference between the target amount of codes generated per unit of time and the amount of information stored in the transmission buffer.

As previously mentioned, the moving picture encoding system computes the target quantiser step size for pictures of a certain type from the corresponding target amount of generated codes according to one selected Q-H plot for that picture type and further computes the target quantiser step sizes for pictures of the other types from the corresponding target amounts of generated codes using a plurality of predetermined conversion equations, respectively. Thus, the moving picture encoding system according to the sixth embodiment can set the target quantiser step sizes for the three different picture types to proper values, and also set the ratio among them to a proper value, by using the simple method mentioned above. Accordingly, the sixth embodiment of the present invention can offer an advantage of being able to control or adjust the amount of codes generated during the encoding of each of a plurality of pictures in the GOP while keeping the relative picture quality among the plurality of pictures adjacent with respect to time.

Seventh Embodiment

As previously mentioned, the moving picture encoding system according to any one of the aforementioned second to sixth embodiments can extract one or more features of a motion video to be encoded and adaptively changes the ratio among the target quantiser step sizes for a plurality of different picture types according to the extracted features. In contrast, a moving picture encoding system according to a seventh embodiment of the present invention is so constructed as to extract one or more features of a sequence of moving pictures to be encoded and determine either the amount of motion between pictures included in one GOP or the complexity of images in the GOP, which is directly related to the amount of generated codes, using the extracted features.

When a plurality of pictures included in a first unit to be encoded includes a picture to be intra-coded or an I-picture, a picture to be predictive-coded or a P-picture, and a picture to be bidirectionally predictive-coded or a B-picture, an encoding control unit 14 extracts one or more features of the sequence of moving pictures to be encoded, which is related to the amount of motion between pictures included in the first unit to be encoded. The encoding control unit 14 then, when the extracted features of the sequence of moving picture indicate that the amount of motion between pictures is relatively small, adjusts the target amounts of generated codes allocated to an I-picture, a P-picture, and a B-picture so that the target amount of generated codes allocated to an I-picture is the largest, the target amount of generated codes allocated to a P-picture is the second-largest, and the target amount of generated codes allocated to a B-picture is the smallest. This is because, when encoding a picture included in a motion video having a small amount of motion between pictures, the reproducibility of a predictive picture 3 obtained by either a forward prediction or forward and backward predictions is good. Consequently, the target amount of generated codes assigned to an I-picture, which can be the predictive picture 3 used for generating a P-picture and a B-picture, is the largest, the target amount of generated codes assigned to a P-picture, which can be used as the predictive picture 3, is the second-largest, and the target amount of generated codes assigned to a B-picture, which cannot be used as the predicted picture 3, is the smallest.

As the amount of motion between pictures increases, the encoding control unit 14 adaptively changes the ratio among the targets for the quantiser step sizes for the different picture types. To be more specific, the encoding control unit 14 changes the ratio so that the differences among the target amounts of generated codes allocated to an I-picture, a P-picture, and a B-picture are reduced. This is because it is necessary to assign a larger amount of generated codes to P-pictures as well as to I-pictures to maintain the picture quality as the amount of motion between pictures increases. Thus the control operation is carried out so that the ratio between the target quantiser step sizes for I-pictures and P-pictures approaches 1 and the difference between Qi and Qp is reduced as the amount of motion between pictures increases.

In addition, it is necessary to assign a larger amount of generated codes to B-pictures, which cannot be used as the predictive image, as well as the amount of motion between pictures increases, as the amount of motion between pictures increases. Thus the control operation is carried out so that the ratio between the target quantiser step sizes for I-pictures (or P-pictures) and B-pictures approaches 1 and the difference between Qi (or Qp) and Qb is reduced as the amount of motion between pictures increases.

Such the control operation thus makes it possible to control the amount of codes generated when encoding each picture according to the amount of motion between pictures while balancing the picture quality of each picture against the picture quality of past and future pictures.

As previously mentioned, the moving picture encoding system according to the seventh embodiment of the present invention can control the target amounts of generated codes allocated to an I-picture, a P-picture, and a B-picture so that the target amount of generated codes allocated to an I-picture is the largest, the target amount of generated codes allocated to a P-picture is the second-largest, and the target amount of generated codes allocated to a B-picture is the smallest when the amount of motion between pictures is relatively small. As the amount of motion between pictures increases, the moving picture encoding system can adaptively change the ratio among the target quantiser step sizes set for the different picture types so that the differences among the target amounts of generated codes allocated to each I-picture, each P-picture, and each B-picture are reduced. Thus, the moving picture encoding system according to the seventh embodiment can set the target quantiser step sizes for the plural different picture types to proper values, and also set the ratio among them to a proper value, by using the simple method mentioned above. Accordingly, the seventh embodiment of the present invention can offer an advantage of being able to control the amount of codes generated during the encoding of each of a plurality of pictures in the GOP while keeping the relative picture quality among the plurality of pictures adjacent with respect to time.

Many widely different embodiments of the present invention may be constructed without departing from the spirit and scope of the present invention. It should be understood that the present invention is not limited to the specific embodiments described in the specification, except as defined in the appended claims.

What is claimed is:

1. A moving picture encoding system for encoding each picture included in a sequence of moving pictures in units of a unit group comprised of a plurality of I, B and P pictures including said each picture, said system comprising:

encoding control means for, when said unit group includes a plurality of different types of pictures which are to be encoded with different encoding methods, setting a target quantizer step size used to encode each of the different types of pictures included in said unit group, and for performing a control operation to generate and furnish an updated quantizer step size for each of said I, B and P pictures so that a ratio among the target quantizer step sizes set for the different picture types is a predetermined one, said control operation not being totally depending on the allocation of quantity of the target amount of codes based on the global complexity measure for each of the picture, but in accordance with features of the sequence of moving pictures which represent a degree of complexity of the sequence of moving pictures to be encoded, wherein if the extracted feature of said sequence of moving pictures indicates that the amount of motion between pictures is relatively small, said encoding control means sets the amounts of generated codes assigned to each I-picture, each P-picture, and each B-picture within said unit group so that the amount of generated codes assigned to each I-picture is the largest, the amount of generated codes assigned to each P-picture is the second-largest, and the amount of generated codes assigned to each B-picture is the smallest, and, as the amount of motion between pictures represented by the extracted feature increases, updates said ratio among the target quantizer step sizes for the different types of pictures so that the differences among the amount of generated codes assigned to each I-picture, each P-picture, and each B-picture are reduced; and encoding means for encoding said each picture included in said sequence of moving pictures including said each picture using said quantizer step size furnished by said encoding control means and using either said each picture or prediction from a past intra-coded image and/or a predictive coded picture, wherein said encoding control means initially sets the quantizer step size for a macroblock to be encoded first in said each picture currently being encoded to the target quantizer step size set for the picture type of said each picture currently being encoded, and then, each time said encoding control means encodes each of macroblocks remaining in said each picture currently being encoded, updates the quantizer step size initially set for the first macroblock so that the average of the quantizer step sizes used during the encoding of all macroblocks in said each picture finally approaches the target quantizer step size set for the picture type of said each picture currently being encoded.

2. The moving picture encoding system according to claim 1, wherein said encoding control means further extracts the feature of said sequence of moving pictures to be encoded which represents a degree of complexity of said sequence of moving pictures to be encoded, and wherein said encoding control means adaptively updates said ratio among the target quantizer step sizes set for the different types of pictures according to said extracted feature of said sequence of moving pictures.

3. The moving picture encoding system according to claim 1, wherein said encoding control means determines whether an amount of codes to be generated when encoding said each picture in the unit group will deviate by a predetermined range or even more from a target amount of generated codes for said each picture if the encoding is carried out using the target quantizer step sizes set for the plurality of picture types, and wherein, if said encoding control means determines that such a deviation from the target amount of generated codes will occur, said encoding control means updates the target quantizer step sizes set for the different types of pictures.

4. The moving picture encoding system according to claim 1, wherein said encoding control means further extracts the feature of said sequence of moving pictures to be encoded which represents a degree of complexity of said sequence of moving pictures to be encoded, and determines whether a scene change has occurred during the encoding of said each picture included in said unit group, and wherein, if said encoding control means determines that a scene change has occurred during the encoding of said each picture, said encoding control means updates said ratio among the target quantizer step sizes set for the different types of pictures and their values according to the extracted feature of said sequence of moving pictures.

5. The moving picture encoding system according to claim 1, wherein said encoding control means determines whether a scene change has occurred during the encoding of said each picture included in said unit group, and wherein, if said encoding control means determines that a scene change has occurred during the encoding of said each picture, said encoding control means adaptively changes the type of the current picture currently being encoded in which the scene change occurs and also updates said ratio among the target quantizer step sizes for the different types of pictures and their values.

6. A moving picture encoding system according to claim 1, wherein said encoding control means only uses an amount of-generated-codes-versus-quantizer- step- size characteristic of pictures of a certain type in order to set the target quantizer step sizes used to encode the different types of pictures which are to be encoded with the different encoding methods.

7. The moving picture encoding system according to claim 1, wherein when said unit group includes a picture to be intra-coded or an I-picture, a picture to be predictive-coded or a P-picture, and a picture to be bidirectionally- predictive-coded or a B-picture, said encoding control means extracts the feature of said sequence of moving pictures which represents a degree of complexity of said sequence of moving pictures to be encoded, and wherein if the extracted feature of said sequence of moving pictures indicates that the amount of motion between pictures is relatively small, said encoding control means sets target amounts of generated codes allocated to each I-picture, each P-picture, and each B-picture in said unit group so that the target amount of generated codes allocated to each I-picture, is the largest, the target amount of generated codes allocated to each P-picture is the second-largest, and the target amount of generated codes allocated to each B-picture is the smallest, and, as the amount of motion between pictures represented by the extracted feature increases, updates said ratio among the target quantizer step sizes for the different types of pictures so that the differences among the target amounts of generated codes allocated to each I-picture, each P-picture, and each B-picture are reduced.

* * * * *